United States Patent [19]

Cuisia et al.

[11] Patent Number: 4,609,483
[45] Date of Patent: Sep. 2, 1986

[54] SCALE INHIBITING COMPOSITION

[75] Inventors: Dionisio G. Cuisia, Chicago; Chih M. Hwa, Palatine, both of Ill.

[73] Assignee: W. R. Grace & Co., New York, N.Y.

[21] Appl. No.: 709,484

[22] Filed: Mar. 7, 1985

[51] Int. Cl.$^4$ .................................................. C02F 5/10
[52] U.S. Cl. ................................................... 252/180
[58] Field of Search ........................................ 252/180

[56] References Cited

U.S. PATENT DOCUMENTS

| | | | |
|---|---|---|---|
| 2,970,959 | 2/1961 | Jones | 252/181 |
| 3,188,289 | 6/1965 | Kahler et al. | 210/698 |
| 3,308,062 | 3/1967 | Gunther | 252/180 |
| 3,328,304 | 6/1967 | Globus | 252/80 |
| 3,483,033 | 12/1969 | Casey | 127/61 |
| 3,539,463 | 11/1970 | Harper et al. | 252/181 |
| 3,720,610 | 3/1973 | Erasmus | 252/8.5 C |
| 3,723,334 | 3/1973 | Maurer | 252/181 |
| 3,985,728 | 10/1976 | Lin | 252/180 |
| 4,085,060 | 4/1978 | Vassileff | 252/180 |
| 4,123,366 | 10/1978 | Sauber et al. | 252/8.5 C |
| 4,354,940 | 10/1982 | Suhac et al. | 210/698 |

*Primary Examiner*—Paul Lieberman
*Assistant Examiner*—Robert A. Wax
*Attorney, Agent, or Firm*—Jill H. Krafte

[57] ABSTRACT

A composition for inhibiting deposition of scale in aqueous systems is disclosed which comprises carboxymethylcellulose and gluconic acid or glucoheptonic acid or both, or their water soluble salts. The composition is incorporated in the aqueous system in concentrations sufficient to substantially completely prevent scale deposition.

9 Claims, No Drawings

SCALE INHIBITING COMPOSITION

BACKGROUND OF THE INVENTION

This invention relates to an improved composition for inhibiting deposition of scale and sludge in aqueous systems. More specifically, small quantities of a composition consisting of sodium carboxymethylcellulose ("CMC") and either gluconic acid or glucoheptonic acid or both, or their water soluble salts are added to the steam generating systems to prevent the formation of scale and sludge deposits therein.

The formation of scale and sludge deposits on heating surfaces is the most serious problem encountered in boiler operations and is the result of entrained scale-forming impurities, such as calcium and magnesium salts, and iron. External softening of boiler feedwater partially removes these substances, but internal chemical treatment is typically applied in industrial boilers and other aqueous systems in order to counteract scale formation. The chemical treatment of boiler water generally involves the combined use of a precipitating agent and a sludge conditioner to maintain the boiler sludge in a fluid form. The chemicals most commonly employed for precipitation of calcium salts are soda ash and the sodium phosphates, for example disodium phosphate, trisodium phosphate and sodium metaphosphate. Magnesium salts are precipitated as magnesium hydroxide by the alkalinity of the boiler water.

The precipitate, or sludge, is rendered non-sticky and easily manageable by the addition of a sludge conditioner, and it is removed from the boiler periodically through the blowdown. Compounds such as polyacrylates, polymethacrylates and carboxymethylcellulose have been used as sludge conditioners in certain settings, such as in food processing plants and in United States Department of Agriculture (USDA) inspected meat and poultry plants. However, in many food processing plants it is required to use only those boiler water additives which are generally recognized as safe ("GRAS") by the Food and Drug Administration ("FDA"). For example, GRAS substances are often preferred where the steam produced in the boiler or steam generating system will contact the food being processed. Polyacrylates and polymethacrylates are not GRAS substances.

Sodium-CMC is a GRAS substance and previously has been used for sludge conditioning, either alone or in combination with other substances. For example, U.S. Pat. No. 3,188,289 (Kahler et al.) discloses the reduction or prevention of deposits in steam generating systems by introducing the sodium salt of CMC into the feedwater. U.S. Pat. No. 3,483,033 (Casey) discloses minimizing the formation of scale deposits during evaporation of raw cane and beet sugar juices by adding a composition comprising a hydrolyzed polyacrylamide, a protective colloid such as sodium alginate or CMC and preferably one or more other ingredients selected from the following: EDTA, a gluconate such as for example sodium-gluconate or sodium gluco-heptonate, and polyphosphates. U.S. Pat. No. 4,085,060 (Vassileff) discloses a composition capable of sequestering metal ions which is a mixture of at least two different hydrophilic polymers, one of which may be CMC with a molecular weight between 600 and 60,000.

Gluconic and/or glucoheptonic acid have been used as sequestering or chelating agents. U.S. Pat. No. 3,308,062 (Gunther) discloses the use of gluconic acid in steam boilers, evaporators, stills and the like in an amount to prevent the formation of scale. U.S. Pat. No. 3,328,304 (Globus) discloses sequestering and/or chelating agents useful in the dairy, brewery and pharmaceutical industries which are prepared by admixture of citric acid (anhydrous), D-gluconic acid (primarily as the lactone), magnesium hydrocarbonate, magnesium acid citrate, and water both in the combined and free states.

Experience has shown that sodium-CMC alone is not completely effective in preventing the formation of boiler scale. Indeed, the compositions discussed above comprise both CMC and one or more other compounds, not all of which are GRAS substances. The composition described herein is an improved sludge conditioner in which the sludge conditioning capabilities of CMC alone have been improved by the inclusion of gluconic acid or glucoheptonic acid or their water soluble salts.

SUMMARY OF THE INVENTION

The improved sludge conditioning composition of this invention comprises carboxylmethylcellulose and either gluconic acid or glucoheptonic acid or both, or their water soluble salts. The composition is capable of preventing and controlling scale deposition in aqueous systems, such as steam generating systems, even when used in small quantities. Each component of the conditioning composition is a GRAS substance and may be used in the preparation of steam generated for contacting food in food processing operations.

It is a primary purpose of this invention to provide a composition which efficiently and effectively prevents the formation and deposition of scale and sludge deposits in aqueous systems, most particularly in steam generating boilers.

It is an additional purpose to provide a composition of these characteristics which consists of GRAS substances and which is suitable for use in food processing operations where the generated steam will contact the food or food ingredients.

Another purpose is to provide a composition which has sufficiently enhanced efficiency that it prevents scale deposition even when used in small quantities.

DESCRIPTION OF THE INVENTION

The scale inhibiting composition disclosed and described herein is intended for use in aqueous systems in which scale deposition is problematic. The composition is ideally suited for use in a steam generating system, particularly where the steam is to be used in food preparation, for the purpose of inhibiting the formation and deposition of scale on heating surfaces. The composition consists of CMC and either gluconic acid or glucoheptonic acid or both, or their water soluble salts. The composition may be used as an additive to the boiler feedwater or may be added directly to the boiler itself.

CMC, one of the components of the composition of this invention, is a water soluble polymer. The polymer is used as a water soluble salt of the carboxylic acid, preferably the sodium salt. The CMC utilized must be of sufficient purity for the intended use of the final composition. That is, if the intended use is in a steam generation system for food processing, U.S.P. (United States Pharmacopeia) grade CMC or food grade CMC must be used, etc. CMC having a molecular weight of about 90,000 to about 500,000 should be selected for the present composition. It is preferred that the molecular weight be in the range of about 200,000 to about 300,000.

The second component is either gluconic acid or glucoheptonic acid, or a combination of gluconic acid and glucoheptonic acid. Any of the water soluble salts of these acids may be utilized, provided that they are compatable with the intended end use, but the sodium salts are preferred. As with the CMC component, the required purity of the gluconic and/or glucoheptonic acid component will depend on the setting in which the composition is used.

It is preferred to use approximately equal portions of the two components, that is, about 50% CMC and about 50% of the gluconic acid and/or glucoheptonic acid component. However, if desired or if necessary based on considerations of cost or availability, it will be acceptable to use from about 1 to 10 parts of CMC to about 10 to 1 parts of the gluconic acid and/or glucoheptonic acid component.

The components may be added to the feedwater or boiler water as a pre-mixed composition. The pre-mixed composition is quite viscous and preferably is mixed in water to achieve a free-flowing aqueous solution. If desired, the two component scale inhibiting composition may be mixed with other boiler water treatment chemicals, such as phosphate, sulfite and caustic soda, for example. Alternatively, the two components may be added separately to the aqueous system to form the scale-inhibiting composition in situ.

The composition described above is intended for use as an additive in aqueous systems, such as boiler water in steam generating facilities, to inhibit and prevent the formation of scale and sludge deposits. Since these deposits are most troublesome on and near heating surfaces, the scale-inhibiting composition of this invention should be present in the boiler water at a point at or prior to the water's contact with heating surfaces. The composition may be added to the boiler feedwater or may be added directly to the boiler, as convenient. The scale inhibiting composition should be present in the boiler water in concentrations of at least about 0.1 ppm, preferably about 5.0 to about 50.0 ppm, for effective scale and sludge control.

The use of the scale inhibiting composition in this manner effectively conditions the boiler water precipitate to inhibit and prevent formation of scale and sludge deposits. The precipitate or sludge is rendered non-sticky and loses its tendency to adhere to the surfaces present in the aqueous system. Rather, the conditioned sludge is easily manageable and may be removed from the system periodically, as necessary and convenient.

The example which follows is given for illustrative purposes and is not meant to limit the invention described herein. The following abbreviations have been used throughout in describing the invention:
CMC—carboxymethylcellulose
FDA Food—and Drug Administration
ft$^2$—square feet gm—gram(s)
GRAS—generally recognized as safe
hr—hour
%—percent
ppm—part(s) per million
psig—pounds per square inch gauge
USDA—United States Department of Agriculture
USP—United States Pharmacopeia

EXAMPLE

This experiment compared the boiler water scale inhibiting properties of the composition of this invention, with sodium-CMC alone, sodium gluconate alone, sodium glucoheptonate alone, and no additive at all. The boiler feedwater was prepared by diluting Lake Zurich, Ill. tap water with distilled water to 40.0 ppm total hardness as calcium carbonate, followed by adjustment to a 1 elemental calcium to magnesium ratio using calcium chloride. Three volumes of feedwater to one volume of a chemical treatment solution were fed to the boiler for each test, giving a feedwater total hardness of 30.0 ppm as calcium carbonate. The composition of the chemical treatment solution was adjusted prior to addition to the feedwater to give concentrations in the boiler water as indicated in Table I. Boiler blowdown was adjusted to 10% of the boiler feedwater, giving approximately ten-fold concentrations of the boiler water salines as compared to the feedwater concentrations. The boiler water also comprised 30.0 ppm of one of the sludge conditioning additives listed in Table II.

TABLE I

| (Boiler Water Composition) | |
|---|---|
| Ingredient | Quantity* |
| Sodium Hydroxide as NaOH | 258 ppm |
| Sodium Carbonate as $Na_2CO_3$ | 120 ppm |
| Sodium Chloride as NaCl | 681 ppm |
| Sodium Sulfite as $Na_2SO_3$ | 50 ppm |
| Sodium Sulfate as $Na_2SO_4$ | 819 ppm |
| Silica as $SiO_2$ | <1 ppm |
| Iron as Fe | 100 ppm |
| Phosphate as $PO_4$ | 10–20 ppm |

*Measured as parts per million in the boiler water (after the ten-fold concentration).

TABLE II

| (Scale Reduction Evaluation) | | | |
|---|---|---|---|
| Sludge Conditioning Additive | Dosage in Boiler Water | Scaling Rate gm/(ft$^2$) (hr) | Scale Red'n |
| Blank (no additive) | — | 0.348 | — |
| Sodium glucoheptonate (I) | 30 ppm | 0.278 | 20.1% |
| Sodium gluconate (II) | 30 ppm | 0.161 | 53.7% |
| Sodium CMC (MW 50,000) (III) | 30 ppm | 0.215 | 38.2% |
| Sodium CMC (MW 70,000) (IV) | 30 ppm | 0.191 | 45.1% |
| Sodium CMC (MW 250,000) (V) | 30 ppm | 0.087 | 75.0% |
| I & III (1:2 mixture) | 30 ppm | 0.144 | 58.6% |
| I & IV (1:1 mixture) | 30 ppm | 0.142 | 59.2% |
| I & V (1:4 mixture) | 30 ppm | 0.014 | 96.0% |
| I & V (1:1 mixture) | 30 ppm | 0.001 | 99.7% |
| II & V (1:1 mixture) | 30 ppm | 0.000 | 100.0% |

All scaling tests were conducted in the following manner: The testing was conducted in a small laboratory boiler having three removable electric heating tubes. The type of boiler used has been described previously in the proceedings of the Fifteenth Annual Water Conference, Engineers Society of Western Pennsylvania, pp. 87–107 (1954). Each test was run for 47 hours at a boiler pressure of 400.0 psig. At the completion of each test, the heating tubes were removed individually from the boiler. The scale or deposit present on six inches of the central length of each tube was removed by scraping, collected in a tared vial and weighed. The results, shown in Table II, indicate that the tested compositions of this invention—that is, compositions comprising sodium-CMC and either sodium gluconate or sodium glucoheptonate—are far superior for reducing scale deposits than the individual components and the boiler water without any sludge conditioner. The composition comprising 250,000 MW sodium-CMC significantly outperformed the compositions comprising lower molecular weight CMC.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

We claim:

1. A composition for inhibiting the deposition of scale in aqueous systems consisting of a first component consisting of carboxymethylcellulose having molecular weight of about 90,000 to about 500,000, and a second component consisting of gluconic acid or glucoheptonic acid or both, or water soluble salts of one or both components.

2. A composition for inhibiting the deposition of scale in aqueous systems which consists of an aqueous solution of a first component consisting of carboxymethylcellulose having molecular weight of about 90,000 to about 500,000, and a second component consisting of gluconic acid or glucoheptonic acid or both, or water soluble salts of one or both components.

3. The composition of claim 2 which is a free-flowing aqueous solution.

4. The composition of claim 1 in which said carboxymethylcellulose has molecular weight of about 200,000 to about 300,000.

5. The composition of claim 1 in which said water soluble salts are sodium salts.

6. The composition of claim 1 in which said components are present in the composition in ratios of about 1:10 to about 10:1.

7. The composition of claim 6 in which said ratio is about 1:1.

8. A composition for inhibiting the deposition of scale in aqueous systems which consists of a first component consisting of carboxymethylcellulose having molecular weight of about 90,000 to about 500,000, and a second component consisting of gluconic acid or glucoheptonic acid or both, or water soluble salts of one or both components, and a third component consisting of one or more boiler water treatment chemicals selected from the group phosphate, sulfite and caustic soda.

9. A composition for inhibiting the deposition of scale in aqueous systems which consists of an aqueous solution of a first component consisting of carboxymethylcellulose having molecular weight of about 90,000 to about 500,000, and a second component consisting of gluconic acid or glucoheptonic acid or both, or water soluble salts of one or both components, and a third component consisting of one or more boiler water treatment chemicals selected from the group phosphate, sulfite and caustic soda.

* * * * *